UNITED STATES PATENT OFFICE.

PHILIP MacGREGOR SHUEY, OF SAVANNAH, GEORGIA.

MANUFACTURE OF FERTILIZER MATERIAL.

1,293,220.

Specification of Letters Patent.

Patented Feb. 4, 1919.

No Drawing. Application filed August 4, 1917. Serial No. 184,472.

*To all whom it may concern:*

Be it known that I, PHILIP MACGREGOR SHUEY, a citizen of the United States, residing at Savannah, in the county of Chatham and State of Georgia, have invented certain new and useful Improvements in the Manufacture of Fertilizer Material, of which the following is a specification.

This invention relates to the manufacture of material for use as or in fertilizer, and it pertains particularly to the conversion of insoluble phosphate—such, for example, as tri-calcium phosphate—contained in apatite and phosphate rocks generally, phosphorites, bones, or other materials, to forms in which they are available to plant life, by the use of niter-cake produced as a by-product of the manufacture of nitric and sulfuric acids and which contains principally sodium acid sulfate and also free sulfuric acid and some normal sodium sulfate.

The process provided by the invention includes the mixing of niter-cake in a molten state with ground phosphate-bearing material, the sodium acid sulfate and the free acid of the niter-cake converting the insoluble tricalcium phosphate into soluble mono- and di-calcium forms.

Inasmuch as niter-cake is in a molten condition at the time it is withdrawn from the niter pots or retorts in which it has been produced as a by-product, the process of this invention can be carried on economically in association with that in which the niter-cake is formed, as that material can be transferred directly from the pots or retorts to an apparatus in which it is mixed with the phosphate-bearing material, and thus the necessity of heating the niter-cake may be avoided.

When molten niter-cake is mixed quickly with ground phosphate-bearing material, the heat of the niter-cake and that generated by the chemical action resulting from the mixing is such as to allow the mass to remain sufficiently liquid or plastic for the time required for it to be mixed thoroughly and dumped before solidification takes place.

In performing the process, molten niter-cake is run, preferably directly from the pots or retorts, into a suitable mixer, and ground phosphate-bearing material is introduced into the mixer at the same time. The proportions of the two materials is dependent upon the estimated acidity of the one material and the estimated insoluble content of the other that it is desired to convert, it being desirable to use sufficient niter-cake to convert practically all of the phosphate from the insoluble to the soluble forms. With the usual run of material containing approximately seventy per cent. bone phosphate of lime or its equivalent, approximately one part by weight of that material is used to two parts by weight of niter-cake. As it is impracticable to weigh flowing molten niter-cake by scales, when the amount of that material in the pots or retorts is uncertain, it may be measured in a standardized measuring boot or vessel before being run into the mixer, the weight of the material being approximately 137 pounds to the cubic foot.

The materials are mixed from one to three minutes or until they are commingled thoroughly, and the mixing is discontinued and the mass removed from the mixer before it has cooled and solidified to such an extent as to have a tendency to clog the apparatus and become difficult of removal. The gases resulting from the chemical reaction are liberated through a vent in the top of the mixer to any desired place of disposal in any suitable manner.

While the mass is in a liquid or plastic state in the mixer and thereafter until cooling, practically eighty-seven per cent. or more of the insoluble tri-calcium phosphate is converted to mono-calcium phosphate and di-calcium phosphate. The liquid or molten condition of the mass accelerates and makes more thorough the chemical action, for, the acid salt being in a molten condition and coming into intimate contact with the phosphate-bearing material, it acts on that salt in practically the same manner as free acid.

On cooling, the mass sets to a rigid porous condition, and it may be disintegrated at once for use as or in fertilizer. However, it is preferable to allow the material to age, inasmuch as on standing it takes up moisture and thereby allows the remaining free acid, and that which may be liberated during aging, to act upon the remaining unconverted phosphate and cause conversion of a considerable part of it to soluble forms. It has been found that a mass that has aged for ten days has ninety per cent. of its phosphate in available form, which is about the proportion of availability that is found in acid phosphate properly made by the methods heretofore employed.

Moreover, as the material becomes softer as a result of aging, it is more easily handled and broken up by treatment in an ordinary fertilizer-mixing machine, as when being mixed with other fertilizer material. The mass will not absorb more than ten per cent. of moisture, except under unusual conditions, but in case there should be an excess of moisture the material may be conditioned by adding calcium cyanamid, lime, or any other suitable dehydrating agent, which will neutralize any remaining free acid, prevent deliquescence, and cause the material to dry out.

During the reaction that occurs in the mass, the sodium acid sulfate may be considered as being broken up, theoretically in accordance with the following equation:

$$2NaHSO_4 = Na_2SO_4 + H_2SO_4,$$

and the sulfuric acid thus liberated becomes available along with that which existed initially in a free state in the niter-cake. The action of the sulfuric acid on the tricalcium phosphate theoretically is in accordance with the following equation:

$$3H_2SO_4 + 2Ca_3(PO_4)_2 = CaH_4(PO_4)_2 + 2CaHPO_4 + 3CaSO_4.$$

Or the entire change representing the reaction between the sodium acid sulfate and tri-calcium phosphate may be expressed in one equation, as follows:

$$6NaHSO_4 + 2Ca_3(PO_4)_2 = CaH_4(PO_4)_2 + 2CaHPO_4 + 3CaSO_4 + 3Na_2SO_4.$$

Thus it will be seen that, as a result of the reactions, the mass contains mono-calcium phosphate, di-calcium phosphate, calcium sulfate, and sodium sulfate. The presence of sodium sulfate is of advantage in the material in that it acts as a partial substitute for potash. Moreover, among the other valuable fertilizer ingredients of niter-cake is potash, which exists in the product produced by this process, for potash always is present to a greater or less extent in the commercial sodium nitrate used in the process that produced the niter-cake.

It will be apparent that, in the manufacture of fertilizer material by this process, the necessity and expense of reheating the niter-cake may be avoided, as it can be used in the molten state it has when taken from the pots or retorts. Moreover, it has advantage over those methods that require grinding of the niter-cake, its mixture with the phosphate-bearing material in the presence of water, and the use of an electric current to accelerate the chemical action, for the time and expense of regrinding and the expense of electricity are not incurred, and it is not necessary to evaporate the excess moisture resulting from the use of water. Further, in view of the fact that ordinary niter-cake has an acidity of from thirty-two to thirty-five per cent. calculated as sulfuric acid, which is slightly over one-half the strength of the acid used in the manufacture of acid phosphate by the usual methods, addition of water to the mixture would reduce the strength to too great a degree to insure complete chemical action, even with the use of an electric current.

Having thus described my invention, what I claim as new, and desire to secure by Letters Patent, is—

1. In the manufacture of fertilizer material, the mixing of molten niter-cake and phosphate-bearing material.

2. In the manufacture of fertilizer material, the mixing of molten niter-cake and ground phosphate-bearing material.

3. The process of making fertilizer material that includes the mixing of niter-cake and phosphate-bearing material, permitting the mass to age, and disintegrating the mass.

4. The process of making fertilizer material that includes the introduction of ground phosphate-bearing material and molten niter-cake into a mixer, mixing the materials therein, and discharging the mass therefrom before solidification.

5. The process of making fertilizer material that includes the introduction of ground phosphate-bearing material and molten niter-cake into a mixer, mixing the materials therein, discharging the mass therefrom before solidification, permitting the mass to age, and disintegrating the mass.

In testimony whereof I affix my signature in presence of two witnesses.

PHILIP MacGREGOR SHUEY.

Witnesses:
MARGARET MURPHY,
E. CARMEL MURPHY.